(12) United States Patent
Zhang

(10) Patent No.: US 7,486,051 B2
(45) Date of Patent: Feb. 3, 2009

(54) CHARGING AND DISCHARGING CONTROL CIRCUIT, AND CHARGING TYPE POWER SUPPLY DEVICE

(75) Inventor: Wei Zhang, Chiba (JP)

(73) Assignee: Seiko Instruments Inc. (JP)

( * ) Notice: Subject to any disclaimer, the term of this patent is extended or adjusted under 35 U.S.C. 154(b) by 321 days.

(21) Appl. No.: 11/054,500

(22) Filed: Feb. 9, 2005

(65) Prior Publication Data

US 2005/0180067 A1 Aug. 18, 2005

(30) Foreign Application Priority Data

Feb. 13, 2004 (JP) .............................. 2004-036574

(51) Int. Cl.
*H02J 7/00* (2006.01)
(52) U.S. Cl. ....................... 320/136; 320/127; 320/128; 320/130; 320/131; 320/132; 320/133; 320/134; 320/135
(58) Field of Classification Search ................. 310/127, 310/128, 130, 131, 133, 134, 132, 135, 136
See application file for complete search history.

(56) References Cited

U.S. PATENT DOCUMENTS

| 5,896,025 | A | * | 4/1999 | Yamaguchi et al. | ......... | 320/134 |
| 6,501,248 | B2 | * | 12/2002 | Fujiwara | ..................... | 320/136 |
| 2001/0026147 | A1 | * | 10/2001 | Nakashimo | ................. | 320/134 |

* cited by examiner

*Primary Examiner*—Akm E Ullah
*Assistant Examiner*—Johali A Torres Ruiz
(74) *Attorney, Agent, or Firm*—Adams & Wilks

(57) ABSTRACT

A charging and discharging control circuit controls charging and discharging of a secondary battery by monitoring at least one of a voltage across, and an electric current through, the secondary battery and controlling a switching circuit in a charging and discharging pathway of the secondary battery. A charging and discharging switch control circuit controls the switching circuit. A driver circuit outputs a signal from the charging and discharging switch control circuit to the switching circuit through an output terminal. A logic circuit compares a voltage of the signal from the driver circuit with a voltage applied to the output terminal from an external portion. The charging and discharging control circuit is switched between a normal operating state and a testing state in accordance with a result of the comparison by the logic circuit.

16 Claims, 3 Drawing Sheets

FIG. 4

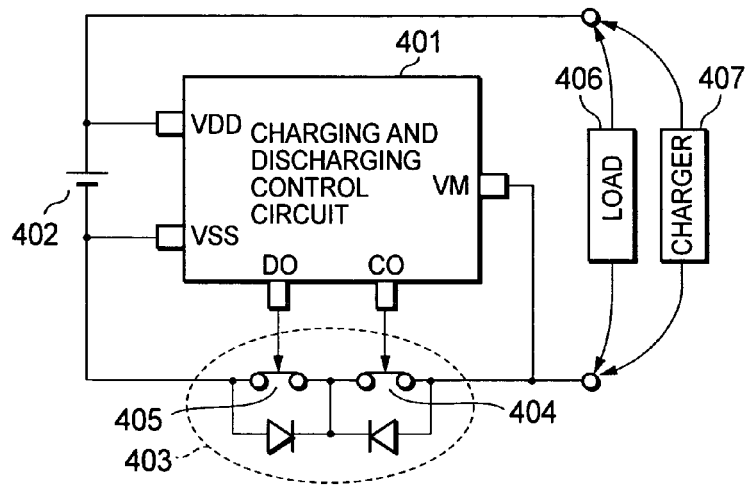

FIG. 5

| CHARGING AND DISCHARGING CONTROL CIRCUIT STATE | DELAY TIME MODE 1 (FUSE IN CONNECTED STATE) | DELAY TIME MODE 2 (FUSE IN DISCONNECTED STATE) |
|---|---|---|
| NORMAL OPERATING STATE | OSCILLATOR AT NORMAL OSCILLATION FREQUENCY<br>OVER-CHARGING DETECTION DELAY TIME<br>$Tc=2^{m-1}*Tclk$<br>OVER-DISCHARGING DETECTION DELAY TIME<br>$Td=2^{n-1}*Tclk$<br>OTHER DETECTION TIMES<br>$Tx=2^{x-1}*Tclk$ | OSCILLATOR AT NORMAL OSCILLATION FREQUENCY<br>OVER-CHARGING DETECTION DELAY TIME<br>$Tc=2^{m-1}*Tclk$<br>OVER-DISCHARGING DETECTION DELAY TIME<br>$Td=2^{n-1}*Tclk$<br>OTHER DETECTION TIMES<br>$Tx=2^{x-1}*Tclk$ |
| TESTING STATE | OSCILLATOR AT ACCELERATION OF K TIMES THE OSCILLATOR FREQUENCY<br>OVER-CHARGING DETECTION DELAY TIME<br>$Tc=Tclk/K$<br>OVER-DISCHARGING DETECTION DELAY TIME<br>$Td=Tclk/K$<br>OTHER DETECTION TIMES<br>$Tx=2^{x-1}*Tclk/K$ | OSCILLATOR AT ACCELERATION OF K TIMES THE OSCILLATOR FREQUENCY<br>OVER-CHARGING DETECTION DELAY TIME<br>$Tc=2^{m-1}*Tclk/K$<br>OVER-DISCHARGING DETECTION DELAY TIME<br>$Td=2^{n-1}*Tclk/K$<br>OTHER DETECTION TIMES<br>$Tx=2^{x-1}*Tclk/K$ |

CHARGING AND DISCHARGING CONTROL CIRCUIT, AND CHARGING TYPE POWER SUPPLY DEVICE

BACKGROUND OF THE INVENTION

1. Field of the Invention

The present invention relates to a charging and discharging control circuit and a charging type power supply device of a secondary battery equipped with the charging and discharging control circuit. In particular, the present invention relates to a method of switching into and out of a testing state for evaluating the characteristics of the charging and discharging control circuit.

2. Description of the Related Art

The features of a lithium ion secondary battery which has greatly contributed to the popularization of mobile devices typified by a mobile telephone and a PHS are its small size, lightweight, and large capacity. Those features have led to realization of long time driving and lightness of the mobile devices. However, since a secondary battery is repeatedly charged and discharged, there is a high probability that the secondary battery will attain an overcharge state or an overdischarge state. If the secondary battery attains the overcharge state, the battery temperature rises so that the internal pressure of the secondary battery is increased and the metal Li is precipitated owing to generation of gas due to the decomposition of an electrolyte. Thus, there is a risk of ignition or explosion of the battery. On the other hand, if the secondary battery attains the overdischarge state, the electrolyte is decomposed to deteriorate the characteristics of the battery. In order to prevent such situations from occurring, a charging and discharging circuit is incorporated in a charging type power supply device.

A basic technique used by a charging and discharging control circuit involves providing a charging and discharging control switch circuit in a charging and discharging pathway, between a secondary battery and a mobile device. The charging and discharging control circuit detects abnormal states, such as an overcharge state in which the secondary battery is charged to a voltage level equal to or greater than a predetermined voltage, an overdischarge state in which the secondary battery is discharged to a voltage level equal to or less than a predetermined voltage, and an over-current state in which the secondary battery is discharged by an excess current. The charging and discharging control switch that opens and closes the current pathway of the charging type power supply device is turned off when an abnormal state is detected, thus preventing overcharge, overdischarge, and over-current states.

A lithium ion secondary battery has high internal impedance, and the battery voltage can consequently be seen to change according to charging and discharging currents. The battery voltage can be seen to be high when a charging current is flowing, while the battery voltage can be seen to be low when a discharge voltage is flowing. It is thus necessary to provide a delay time for detecting the abnormal states such as overcharge and overdischarge. However, the delay time causes extra time to be required to test the charging and discharging control circuit during an inspection process.

In particular, the delay time for detecting overcharge is generally set to a value on the order of several seconds. It is thus necessary to provide a testing state for the charging and discharging control circuit that shortens the delay time in order to shorten the testing time.

A method of controlling a delay circuit by adding one input terminal to the charging and discharging control circuit, and a method of initiating a testing state by applying a high voltage to a connection terminal of a charging device, exist for the testing state of the charging and discharging control circuit.

FIG. 2 shows a conventional charging and discharging control circuit, and discloses a case of applying a voltage equal to or greater than a prescribed voltage, the voltage being higher than that applied during normal operation, to the connection terminal of the charging device.

When an overcharge state occurs in a normal operating state, output from an overcharge detection comparator 213 becomes high level, and an internal portion control circuit 220 outputs a control signal to an internal portion delay circuit 221. The internal portion delay circuit 221 outputs a signal that controls a switching circuit 202 after a delay time t1 prescribed by using the output voltage as an input signal.

When a voltage equal to or greater than the high prescribed voltage is applied to the connection terminal of the charging device, and the voltage of the over-current detection terminal increases to be equal to or greater than the prescribed voltage, output from a Voltage detection comparator 215 becomes a high level. At this point the internal portion control circuit 220 is placed in a testing state to output a control signal that shortens the delay time of the internal portion delay circuit 221.

When an overcharge state occurs in the testing state, output from the overcharge detection comparator 213 becomes a high level, and the internal portion control circuit 220 outputs a control signal to the internal portion delay circuit 221. After a delay time t2 shortened by using the output voltage as an input signal, the internal portion delay circuit 221 outputs a signal that controls the switching circuit 202.

Problems like those described below exist with the conventional technique described above.

A very large number of the charging and discharging control circuits packed into a small size package are utilized. Accordingly, adding external portion terminals in order to control the detection delay time during testing invites cost increases, and this is not received well by the marketplace. Achieving this type of control function by using a small number of external portion terminals is therefore a large problem.

On the other hand, with a method that utilizes the over-current detection terminal, it is necessary to add a circuit in order to divide the voltage of the over-current detection terminal into a plurality of levels and detect the levels. In particular, the circuit structure becomes complex with the technique described above when a plurality of levels of over-current detection are required, and there is a problem in that it is difficult to ensure stable operation.

It is necessary to perform initial measurement during manufacturing of the charging and discharging control circuit in order to trim voltages used for detecting and releasing overcharge and overdischarge to a set voltage. When doing so, it becomes necessary to wait for a period of time equal to or greater than several seconds of the delay time when adding voltage in steps input to the charging and discharging control circuit. Assuming that the detection voltage is measured in 25 steps, and the delay time is set to 5 seconds, the amount of time needed to measure the overcharge detection voltage becomes 125 seconds. Even if a testing state that shortens the delay time to 1/50 of the normal delay time, for example, is used, 2.5 seconds will still be required per chip. This is a serious problem that invites increased testing costs during a manufacturing process.

In other words, it is necessary to further shorten the detection delay time in a manufacturing facility. It is also necessary to have both a state in which there is a delay time during normal operations, and a testing state having a short delay time, for customer IC evaluation and the like.

SUMMARY OF THE INVENTION

It is therefore an object of the present invention to reduce mass production costs by achieving a test function controlled from an external portion, without adding external portion terminals, and further, by providing a plurality of delay time modes.

In order to solve the problems described above, a charging and discharging control circuit is provided with means for switching between a normal state of controlling charging and discharging of a secondary battery, and a testing state for evaluating the characteristics of the control circuit, according to whether or not a voltage is applied to an output terminal of a control signal from an external portion.

Further, provided is accelerating means for shortening the delay time of a delay circuit in the testing state by increasing the oscillation frequency of an oscillator circuit that configures the delay circuit.

In addition, provided is means for switching between a delay time mode in which a delay of a portion of the charging and discharging control circuit does not pass through a counter circuit of the delay circuit (hereinafter called a delay time mode 1) and a delay time mode in which all delays of the charging and discharging control circuit pass through the counter circuit of the delay circuit (hereinafter called a delay time mode 2) according to the presence or absence of a fuse provided to the charging and discharging control circuit in the testing state.

According to the present invention, switching between the normal state and the testing state can be performed by applying a voltage from an external portion to the output terminal of the control signal of the charging and discharging control circuit. In addition, switching the delay time according to the presence or absence of a fuse in the testing state becomes possible. Consequently, the charging and discharging control circuit of the present invention achieves a testing function without adding terminals, and achieves increased testing time efficiency by providing a plurality of delay times in the testing state.

BRIEF DESCRIPTION OF THE DRAWINGS

In the accompanying drawings:

FIG. 4 is a diagram that shows the configuration of a charging and discharging control circuit and a charging type power supply device proposed by the present invention; and FIG. 5 is a diagram that explains details about a normal state and various delay times of a testing state for a charging and discharging control circuit of the present invention.

DETAILED DESCRIPTION OF THE PREFERRED EMBODIMENTS

Figure 1:
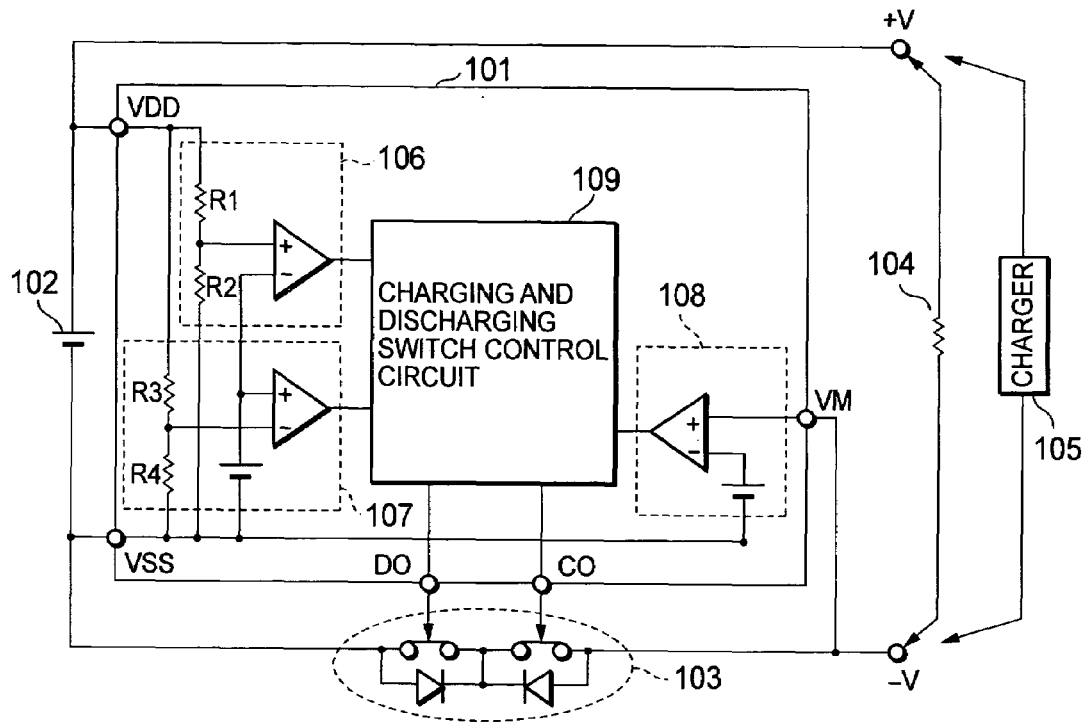
FIG. 1 is a block diagram that shows an embodiment of a charging and discharging control circuit of the present invention.
Figure 2:
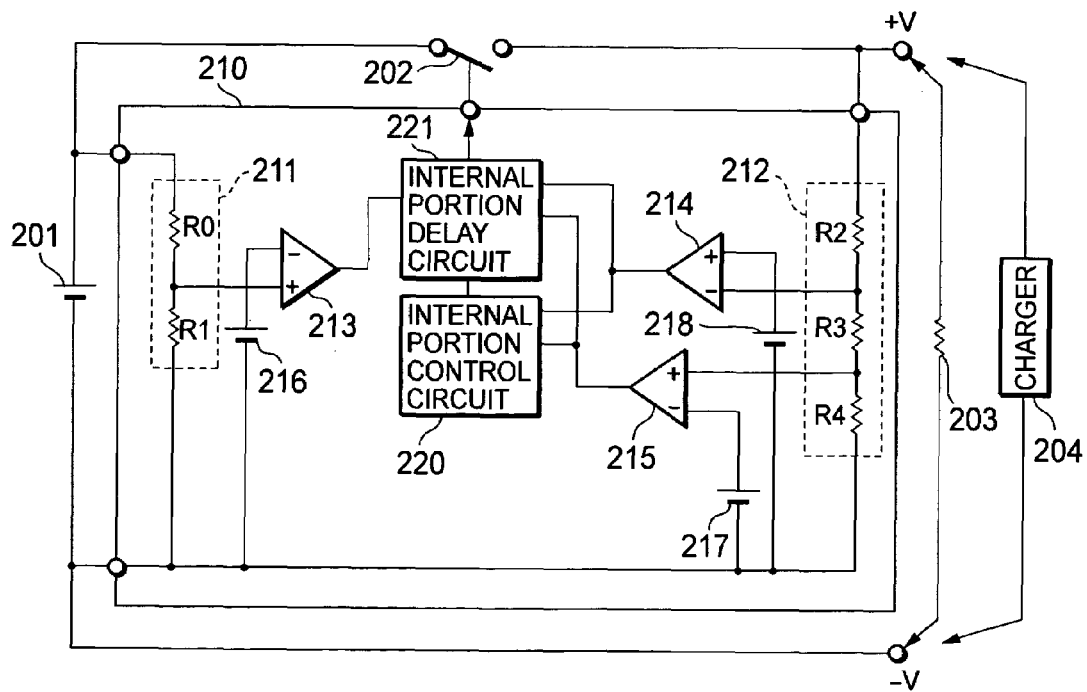
FIG. 2 is a diagram that shows an embodiment of a conventional charging and discharging control circuit.
Figure 3:
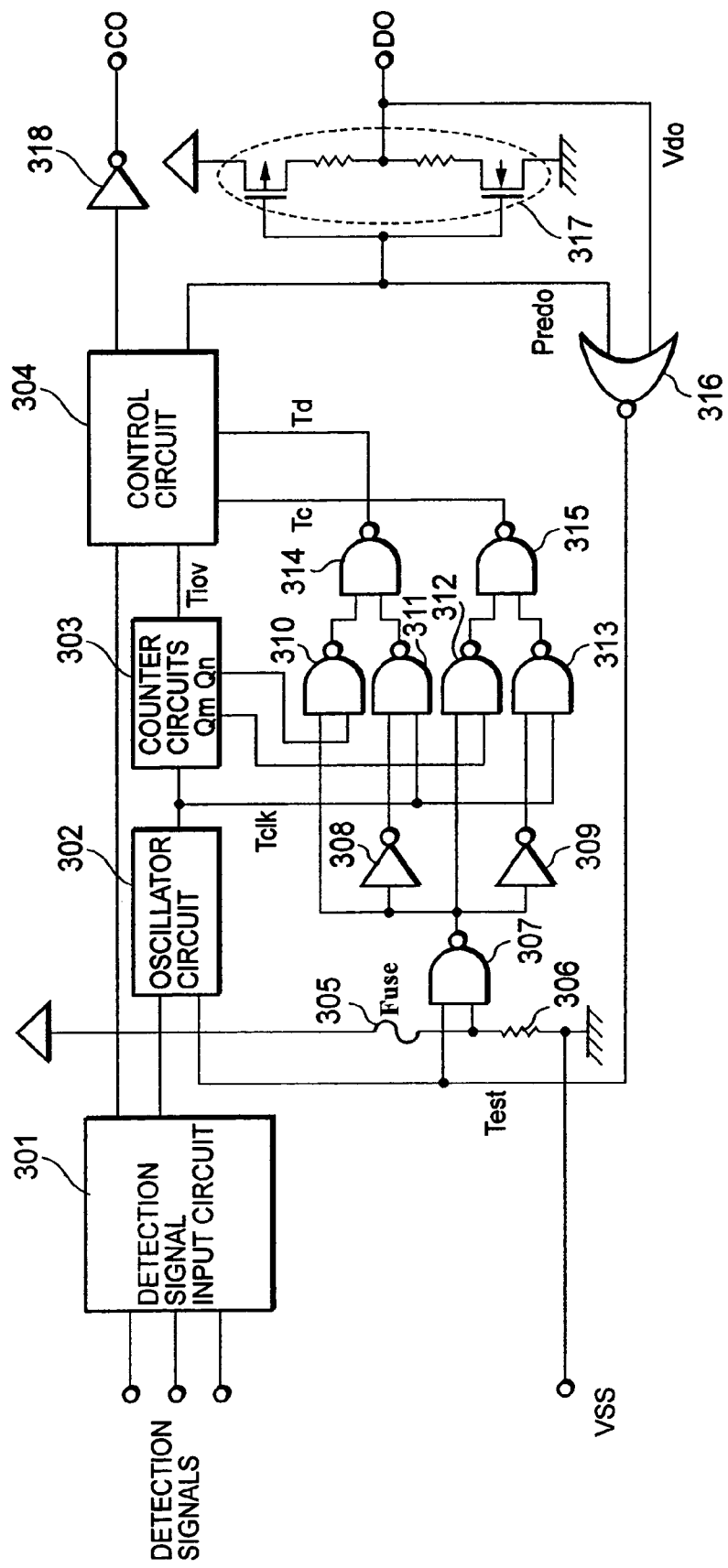
FIG. 3 is a block diagram that shows an embodiment of a charging and discharging control circuit of the present invention.

Embodiments of the present invention are explained in detail below with reference to the drawings. FIG. 1 is a block diagram of a charging and discharging control circuit 101 according to one embodiment of the present invention. A charging and discharging switch control circuit 109 includes a delay circuit which determines a delay time for the charging and discharging control circuit. FIG. 3 shows details of the charging and discharging switch control circuit 109 including the delay circuit of FIG. 1. FIG. 4 shows a configuration of a charging type power supply device that utilizes a charging and discharging control circuit 401 proposed by the present invention.

The charging and discharging control circuit 401 of FIG. 4 includes a positive electrode connection terminal VDD and a negative electrode connection terminal VSS of a secondary battery 402, an over-current detection terminal VM, a charging control output terminal CO, and a discharging control output terminal DO. The charging and discharging control circuit 401 controls charging and discharging of the secondary battery 402 by monitoring the voltage across and the current through the secondary battery 402, and outputting a control signal to a charging and discharging control switch circuit 403. The charging and discharging control switch circuit 403 is disposed on the negative electrode connection terminal VSS side, and is configured by an NMOS transistor charging switch 404 and an NMOS transistor discharging switch 405. The charging and discharging control switch circuit 403 can also be disposed on the positive electrode connection terminal VDD side and PMOS transistors may be used therefor.

In FIG. 3, a detection signal input circuit 301 inputs a detection signal from a circuit that detects states of the secondary battery. An oscillator circuit 302 is a portion of the delay circuit that determines the delay time. The oscillator circuit 302 determines a clock period Tclk. A counter circuit 303 is a portion of the delay circuit that determines the delay time. A control circuit 304 controls charging and discharging of the secondary battery. The control circuit 304 outputs control signals to the charging control output terminal CO and the discharging control output terminal DO through output drivers 317 and 318 on the basis of the signal from the detection signal input circuit 301, thus turning the charging and discharging control switch circuit 403 on and off and performing charging and discharging control of the secondary battery.

A fuse 305 of FIG. 3 switches between the delay time mode 1 and the delay time mode 2. A switch control signal Predo input to the output driver 317 and an output signal Vdo are input to an NOR 316. An output signal Test from the NOR 316 determines whether the normal operating state or the testing state is used.

Operation of the charging and discharging control circuit of the present invention is explained next with reference to FIG. 1, FIG. 3, and FIG. 4.

In FIG. 4, when the charging and discharging control switch circuit 403 uses NMOS transistors, the circuit is configured as follows. The charging control output terminal CO and the discharging control output terminal DO are both high (hereinafter "H") when the secondary battery 402 is in the normal operating state, and not in the overcharge state, the overdischarge state, or the over-current state. The charging control output terminal CO is low (hereinafter "L") when the secondary battery 402 is in the overcharge state, and the discharging control output terminal DO is "L" when the secondary battery 402 is in the overdischarge state or the over-current state. The switching control signal Predo output by the control circuit 304 is thus "L", and the discharging control output terminal DO is "H", namely the positive electric potential VDD during the normal operating state.

As shown in FIG. 3, the test signal Test output by the NOR 316 is always "L" except when a voltage is applied from an external portion to the discharging control output terminal DO. At that point, the same voltage as the VSS electric potential is applied from the external portion to the discharging control output terminal DO, forcibly making the discharging control output terminal DO "L". The test signal Test thus becomes "H", thus placing the charging and discharging control circuit 401 in the testing state. The test signal Test becomes "L" when the voltage is no longer applied form the external portion, and the charging and discharging control circuit 401 returns to the normal operating state.

In the normal operating state, the control circuit 304 turns the charging and discharging control switch circuit 403 on and off through the charging control output terminal CO and the discharging control output terminal DO based on information acquired from the detection signal input circuit 301, such as the battery state and the charging and discharging currents. When the test signal Test is "L", the oscillator circuit is made to oscillate at the normal clock period Tclk. Further, once output from a NAND 307 becomes "H" due to the signal Test, the overcharge and overdischarge detection delay time becomes a delay time via the counter circuit 303. For example, when the detection signal input circuit 301 detects an overcharge state of the secondary battery 402, the oscillator circuit is made to oscillate, and a signal at the clock period Tclk is sent to the counter circuit 303. An overcharge delay time Tc extracted from an m level Qm of the counter circuit 303 is found according to the following equation:

$$Tc = 2^{m-1} * Tclk \quad (Eq. 1)$$

When the detection signal input circuit 301 detects an overcharge state of the secondary battery 402, the charging control switch 404 is turned off over the overcharge detection delay time Tc. Similarly, an overdischarge detection delay time Td extracted from an n level Qn of the counter circuit 303 is found according to the following equation:

$$Td = 2^{n-1} * Tclk \quad (Eq. 2)$$

When the detection signal input circuit 301 detects an overdischarge state of the secondary battery 402, the control circuit 304 turns off the discharging control switch 405 through the discharging control output terminal DO over the overdischarge detection delay time Td. For example, when the period Tclk of the oscillator circuit is 300 μs, the overcharge detection delay time is taken from a 15th level Q15 of the counter, and the overdischarge delay time is taken from a 10th level Q10 of the counter, the overcharge detection delay time Tc then becomes 4.9 ms and the overdischarge detection delay time Td becomes 154 ms according to Eq. 1 and Eq. 2.

On the other hand, when in the testing state, the control circuit 304 turns the charging and discharging control switch circuit 403 on and off through the charging control output terminal CO and the discharging control output terminal DO, based on information acquired from the detection signal input circuit 301 such as the battery state and the charging and discharging currents. However, the test signal Test is "H". Accordingly, the oscillator circuit is made to oscillate at acceleration of K times the oscillation frequency, thus obtaining an acceleration clock period of Tclk/K. Further, the output of the NAND 307 is determined by the connection state of the fuse 305. Accordingly, switching can be performed between the output taken directly from the oscillator circuit 302 and the output taken from the counter circuit 303 during the overcharge detection delay time and the overdischarge detection delay time.

When making measurement at a manufacturing facility in order to regulate the overcharge/overdischarge detection/release voltages by trimming, the fuse 305 is placed in a connected state. The output of the NAND 307 thus becomes "L". In this case, the overcharge detection delay time and the overdischarge detection delay time are directly taken from the output of the oscillator circuit 302 by a logic circuit including inverters 308 and 309, and NANDs 310, 311, 312, 313, 314, and 315. Accordingly, the overcharge detection delay time Tc is found according to the following equation:

$$Tc = Tclk/K \quad (Eq. 3)$$

The overdischarge detection delay time Td is similarly found according to the following equation:

$$Td = Tclk/K \quad (Eq. 4)$$

Further, the over-current delay time is taken from the counter circuit 303, and accordingly, there is only a shortening effect due to the acceleration of the oscillator circuit 302. For example, when the clock period Tclk of the oscillator circuit is 300 μs and the acceleration coefficient K of the oscillator circuit 302 is set to 50, each of the overcharge detection delay time Tc and the overdischarge detection delay time Td becomes 6 μs according to Eq. 3 and Eq. 4. The overcharge detection delay time is complete in several micro seconds compared with the several seconds used in the normal operating state. It thus becomes possible to save a great amount of testing time when accurately measuring the overcharge detection voltage.

When the fuse 305 is placed in a cutoff state due to IC evaluation by a customer or the like, the output of the NAND 307 becomes "H" due to a pull-down resistance 306. In this case, the overcharge detection delay time and the overdischarge detection delay time similarly become the delay time taken from the counter by the logic circuit including the inverters 308 and 309, and the NANDs 310, 311, 312, 313, 314, and 315. However, the output terminal DO is connected to VSS at this point, and the test signal Test becomes "H". Accordingly, the oscillator circuit is accelerated by a factor of K, and the overcharge detection delay time Tc is found according to the following equation:

$$Tc = 2^{m-1} * Tclk/K \quad (Eq. 5)$$

The overdischarge detection delay time Td is found according to the following equation:

$$Td = 2^{n-1} * Tclk/K \quad (Eq. 6)$$

Further, accelerating the oscillator circuit also shortens the over-current detection delay time. This is the delay time mode 2. For example, when the clock period Tclk of the oscillator circuit 302 is 300 μs and the acceleration coefficient K of the oscillator circuit is set to 50, the overcharge detection delay time Tc becomes 98 ms and the overdischarge detection delay time Td becomes 3 ms according to Eq. 5 and Eq. 6. Thus, it becomes possible to shorten the delay time for overcharge detection, for measuring the overcharge release voltage value, for overdischarge detection, and for measuring the overcharge release voltage value. In addition, the testing time can also be saved in evaluating the overcharge detection delay time and the overdischarge detection delay time.

FIG. 5 summarizes the details about the delay times for the normal operating state and for the testing state of the charging and discharging control circuit of the present invention. It can be seen that the time necessary for making measurement in the manufacturing facility can be greatly shortened, and that the time necessary for testing the charging and discharging control circuit can be shortened while maintaining a sufficiently long delay time in the normal operating state.

In FIG. 3, the testing state of the charging and discharging control circuit is realized by utilizing a voltage applied from an external portion to the discharging control output terminal DO. According to the circuit structure, it is also possible to achieve the same functionality by using the charging control output terminal CO.

What is claimed is:

1. A charging and discharging control circuit for controlling charging and discharging of a secondary battery by monitoring at least one of a voltage across, and an electric current through, the secondary battery and controlling a switching circuit in a charging and discharging pathway of the secondary battery, the charging and discharging control circuit comprising:
   a charging and discharging switch control circuit for controlling the switching circuit;
   a driver circuit for inverting and outputting a signal from the charging and discharging switch control circuit to the switching circuit through an output terminal; and
   a logic circuit for comparing a voltage of an input terminal of the driver circuit with a voltage of an output terminal of the driver circuit;
   wherein the charging and discharging control circuit is switched from a normal operating state to a testing state when the voltages compared by the logic circuit are the same.

2. A charging and discharging control circuit according to claim 1; further comprising a delay circuit comprised of an oscillator and a counter for generating a delay time; and accelerating means for shortening the delay time generated by the delay circuit by increasing an oscillation frequency of the oscillator in the testing state.

3. A charging and discharging control circuit according to claim 2; further comprising means for switching in the testing state between a delay time mode in which all of a plurality of delay signals pass through the counter of the delay circuit, and a delay time mode in which at least one of the delay signals does not pass through the counter of the delay circuit.

4. A charging and discharging control circuit according to claim 3; wherein the means for switching in the testing state includes means for switching the delay time mode in accordance with the presence or absence of a fuse provided in the charging and discharging switch control circuit.

5. A charging type power supply device comprising: a secondary battery; a charging and discharging control circuit according to claim 1; and a switching circuit for controlling charging and discharging of the secondary battery in accordance with an output signal from the charging and discharging control circuit.

6. A charging and discharging control circuit according to claim 1; wherein the charging and discharging switch control circuit comprises a delay circuit for generating a delay time for the charging and discharging control circuit.

7. A charging and discharging control circuit according to claim 6; wherein the delay circuit includes an oscillation circuit; and further comprising accelerating means for shortening the delay time of the delay circuit in the testing state by increasing an oscillation frequency of the oscillation circuit.

8. A charging and discharging control circuit according to claim 1; wherein the charging and discharging control circuit is switched between the normal operating state and the testing state in accordance with whether or not the comparison by the logic circuit determines that a voltage applied to the output terminal is the same as a voltage of the signal outputted by the driver circuit.

9. A charging and discharging control circuit for controlling charging and discharging of a secondary battery, the charging and discharging control circuit comprising:
   a charging and discharging switch control circuit for controlling a switching circuit in a charging and discharging pathway of a secondary battery;
   a driver circuit for inverting and outputting a signal from the charging and discharging switch control circuit to the switching circuit through an output terminal;
   a logic circuit for comparing a voltage of an input terminal of the driver circuit with a voltage of an output terminal of the driver circuit; and
   switching means for switching the charging and discharging control circuit from a normal operating state of controlling charging and discharging of the secondary battery to a testing state of evaluating characteristics of the charging and discharging control circuit when the voltages compared by the logic circuit are the same.

10. A charging and discharging control circuit according to claim 9; wherein the logic circuit includes means for detecting the voltage applied to the output terminal from the external portion.

11. A charging and discharging control circuit according to claim 9; wherein the charging and discharging switch control circuit comprises a delay circuit for generating a delay time for the charging and discharging control circuit.

12. A charging and discharging control circuit according to claim 11; wherein the delay circuit includes an oscillation circuit; and further comprising accelerating means for shortening the delay time of the delay circuit in the testing state by increasing an oscillation frequency of the oscillation circuit.

13. A charging and discharging control circuit according to claim 9; further comprising a delay circuit comprised of an oscillation circuit and a counter circuit for generating a delay time; and accelerating means for shortening the delay time generated by the delay circuit by increasing an oscillation frequency of the oscillation circuit in the testing state.

14. A charging and discharging control circuit according to claim 13; further comprising means for switching in the testing state between a delay time mode in which all of a plurality of delay signals pass through the counter circuit, and a delay time mode in which at least one of the delay signals does not pass through the counter circuit.

15. A charging and discharging control circuit according to claim 14; wherein the means for switching in the testing state includes means for switching the delay time mode in accordance with the presence or absence of a fuse provided in the charging and discharging switch control circuit.

16. A charging type power supply device comprising: a secondary battery; a charging and discharging control circuit according to claim 9; and a switching circuit for controlling charging and discharging of the secondary battery in accordance with a control signal from the charging and discharging control circuit.

* * * * *